(12) United States Patent
Audette (10) Patent No.: US 10,227,165 B2
(45) Date of Patent: Mar. 12, 2019

(54) CONTAINER LID RELEASE APPARATUS AND METHOD

(71) Applicant: SharkNinja Operating LLC, Newton, MA (US)

(72) Inventor: David M. Audette, Webster, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 10 days.

(21) Appl. No.: 14/203,741

(22) Filed: Mar. 11, 2014

(65) Prior Publication Data

US 2014/0263340 A1    Sep. 18, 2014

Related U.S. Application Data

(60) Provisional application No. 61/792,067, filed on Mar. 15, 2013.

(51) Int. Cl.
    *B65D 45/06* (2006.01)
    *B65D 43/26* (2006.01)
    *A47J 43/07* (2006.01)

(52) U.S. Cl.
    CPC .............. *B65D 43/26* (2013.01); *A47J 43/07* (2013.01); *B65D 45/06* (2013.01)

(58) Field of Classification Search
    CPC . A47J 43/0777; B65D 43/265; B65D 43/267; B65D 2251/1075; B65D 45/06
    USPC .......... 220/243, 244, 285, 212.5, 710.5, 318
    See application file for complete search history.

(56) References Cited

U.S. PATENT DOCUMENTS

| 433,726 | A |   | 8/1890  | Fliehr |
|---|---|---|---|---|
| 2,364,206 | A | * | 12/1944 | Gardes ................... B65D 45/06 220/378 |
| 2,734,656 | A | * | 2/1956  | Schonfeld ...................... 220/244 |
| 2,959,320 | A | * | 11/1960 | Feagan et al. ................ 220/244 |
| 3,275,366 | A | * | 9/1966  | Hidding ........................ 294/31.2 |
| 3,338,461 | A | * | 8/1967  | Cookson ....................... 220/269 |
| 4,114,236 | A | * | 9/1978  | Vandervort ..................... 16/335 |
| 4,253,568 | A | * | 3/1981  | Long et al. ................. 206/387.1 |
| 4,690,296 | A | * | 9/1987  | Elliott ............................ 251/299 |
| 4,793,290 | A | * | 12/1988 | O'Donnell ...................... 119/62 |
| 5,724,837 | A | * | 3/1998  | Shin ................................ 68/196 |
| 6,415,786 | B1 |   | 7/2002  | Kolbe et al. |
| 6,745,923 | B2 | * | 6/2004  | Julian ........................ 222/541.6 |
| 2006/0025823 | A1 |   | 2/2006  | Jonsen |

(Continued)

FOREIGN PATENT DOCUMENTS

| CN | 101618370 A | 1/2010 |
|---|---|---|
| NZ | 594673 A | 12/2012 |

(Continued)

OTHER PUBLICATIONS

International Search Report and Written Opinion for PCT/US2014/022978 dated Feb. 5, 2015.

(Continued)

*Primary Examiner* — James N Smalley
(74) *Attorney, Agent, or Firm* — Cantor Colburn LLP (57) ABSTRACT

A lid release mechanism and a lid locking mechanism for a food processing apparatus are disclosed. The lid release mechanism facilitates removal of a lid from a container via a camming surface in some embodiments. For removal, the lid may be initially tilted to break the seal between the lid and the container. A lid locking mechanism may be included, and in some embodiments, the motion to unlock the lid (e.g., pivoting an arm) also starts lid removal.

18 Claims, 11 Drawing Sheets

(56) References Cited

U.S. PATENT DOCUMENTS

| | | | |
|---|---|---|---|
| 2007/0012707 A1* | 1/2007 | Rattay | 220/762 |
| 2007/0175909 A1* | 8/2007 | Solowiejko | 220/826 |
| 2010/0004109 A1* | 1/2010 | Ballhause | B04B 5/0421 494/40 |
| 2012/0024993 A1* | 2/2012 | Audette | A47J 43/0777 241/30 |
| 2012/0024995 A1* | 2/2012 | Audette | 241/37.5 |
| 2012/0026827 A1* | 2/2012 | Audette | 366/293 |
| 2013/0140309 A1* | 6/2013 | George | 220/254.1 |

FOREIGN PATENT DOCUMENTS

| | | | | |
|---|---|---|---|---|
| WO | 0160705 A2 | 8/2001 | | |
| WO | 2009153222 A1 | 12/2009 | | |
| WO | WO 2013/016533 A1 | 1/2013 | | |
| WO | WO 2013023253 A1 * | 2/2013 | | B65D 47/12 |

OTHER PUBLICATIONS

First Office Action and Search Report; Chinese Application No. 201480014609.2; dated Jan. 19, 2017; 19 Pages.

AU Office Action; Application No. 2014237320; dated Oct. 13, 2017; pp. 1-3.

Chinese Office Action with translation; Application No. 201480014609.2; dated Jan. 19, 2017; pp. 1-19.

Chinese Office Action with translation; Application No. 201480014609.2; dated Sep. 14, 2017; pp. 1-21.

NZ Office Action; New Zealand Patent Application No. 711224; dated Jun. 13, 2017; pp. 1-4.

NZ Office Action; New Zealand Patent Application No. 711224; dated Dec. 13, 2017; pp. 1-3.

AU Office Action; Application No. 2014237320; dated Feb. 27, 2018; pp. 1-7.

Chinese Office Action with translation; Application No. 201480014609.2; dated Mar. 22, 2018; pp. 1-17.

NZ Office Action; New Zealand Patent Application No. 711224; dated Mar. 27, 2018; pp. 1-3.

EP Communication Pursuant to Article 94(3) EPC; Application No. 14 720 295.6-1006; dated Aug. 10, 2018; pp. 1-4.

Invitation to Pay Additional Fees for PCT/US2014/022978 dated Aug. 7, 2014.

* cited by examiner

CONTAINER LID RELEASE APPARATUS AND METHOD

RELATED APPLICATIONS

This Application claims the benefit under 35 U.S.C. § 119(e) of U.S. Provisional Application Ser. No. 61/792,067, entitled "CONTAINER LID RELEASE APPARATUS AND METHOD" filed on Mar. 15, 2013, the entire contents of which are incorporated herein by reference.

FIELD

Aspects herein generally relate to a container lid mechanism for a food processing apparatus and methods of using a container lid mechanism.

DISCUSSION OF RELATED ART

Food processors such as blenders process foods within containers. Food processor containers typically include removable lids. Some conventional food processor lids form a tight interference fit with their associated containers.

SUMMARY

According to one embodiment of the invention, an apparatus includes a container, a lid, an arm that is moveable relative to the lid, and a camming surface. The container includes a contact surface. When the lid is engaged with the container, movement of the arm relative to the lid causes the camming surface to move relative to the contact surface. Movement of the camming surface relative to the contact surface causes at least a portion of the lid to move in a direction away from the container.

According to another embodiment of the invention, a method includes providing a lid that is engaged with a container and moving an arm relative to the lid. The container includes a contact surface. Movement of the arm relative to the lid causes a camming surface to move relative to the contact surface. Movement of the camming surface relative to the contact surface causes at least a portion of the lid to move in a direction away from the container.

According to yet another embodiment of the invention, an apparatus includes a food processor container having a contact surface, a lid configured to engage with the container, an arm attached to the lid, and a first protrusion extending from the arm. The arm is rotatable relative to the lid and the first protrusion has a rounded surface arranged to contact the contact surface when the lid is engaged with the container and the arm is rotated relative to the lid.

According to yet another embodiment of the invention, an apparatus includes a food processor container and a lid configured to engage with the container. The food processor container has a top opening and a rim surrounding the opening. The container includes a first curved contact surface with an upwardly facing concave. The contact surface is attached to an outside of the rim.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

A conventional blender or food processor often includes a removable lid to cover the container within which foods are processed. In some arrangements, a gasket or other seal may be included to provide a sealing engagement between the container and the lid. In some cases, the gasket may be fixed to the lid and interact with the container. In other cases, the gasket may be fixed to the container and interact with the lid. The inventors have recognized that, where a gasket or other seal provides a sealing engagement between a lid and a container, it can be difficult to remove the lid from the container by pulling upwardly on the lid due to continued sealing interaction between the gasket and the container or between the gasket and the lid. As the lid is being pulled away from the container, but before the seal has been released, the volume of the container is increasing without air being allowed to enter the container. As such, a differential pressure forms and removal of the lid can be difficult.

The inventors have appreciated that tilting the lid slightly at the start of lid removal to form a slight separation between a portion of the gasket and a portion of either the lid or container can significantly ease the lid removal process. Additionally, the inventors have recognized that an arrangement which provides a mechanical advantage at the start of lid removal can facilitate removal of the lid from the container. Further, incorporating this tilting and/or mechanical advantage into a movement that may already exist as part of lid unlocking and/or removal can be particularly advantageous in some embodiments.

Provided herein are embodiments where a food processing apparatus includes a lid release mechanism that facilitates removal of a lid from a container. Also provided herein are embodiments where a food processing apparatus includes a lid locking mechanism that locks a lid to a container.

As used herein, the terms "connected," "attached," or "coupled" are not limited to a direct connection, attachment, or coupling, as two components may be connected, attached, or coupled to one another via intermediate components.

Any of the embodiments or aspects disclosed herein may be used with a blender or other food processor.

Figure 1:
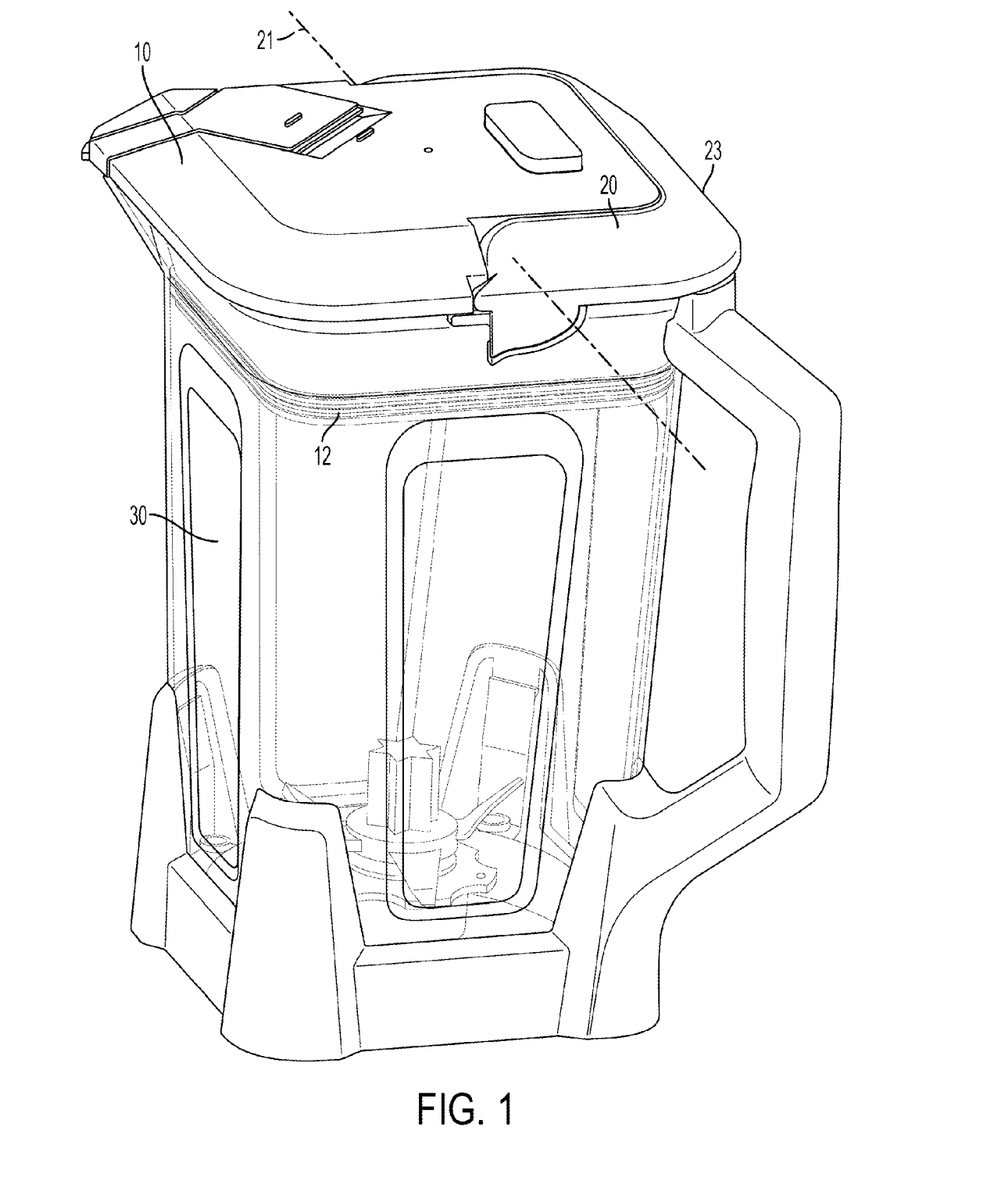
FIG. 1 is a perspective view that depicts a container, a lid, and a lid mechanism in accordance with an aspect of the invention.

According to one embodiment, as shown in FIG. 1, a container 30 engages with a removable lid 10. The lid 10 may include an arm 20 that may be pivotally attached to the lid 10. In some embodiments, as shown in FIG. 1, the arm 20 may be shaped to be easily grasped by the user such that the arm can serve as a handle. The arm 20 may be a straight elongated member, may be curved, or any other suitable shape, as this aspect is not so limited.

Figure 2:
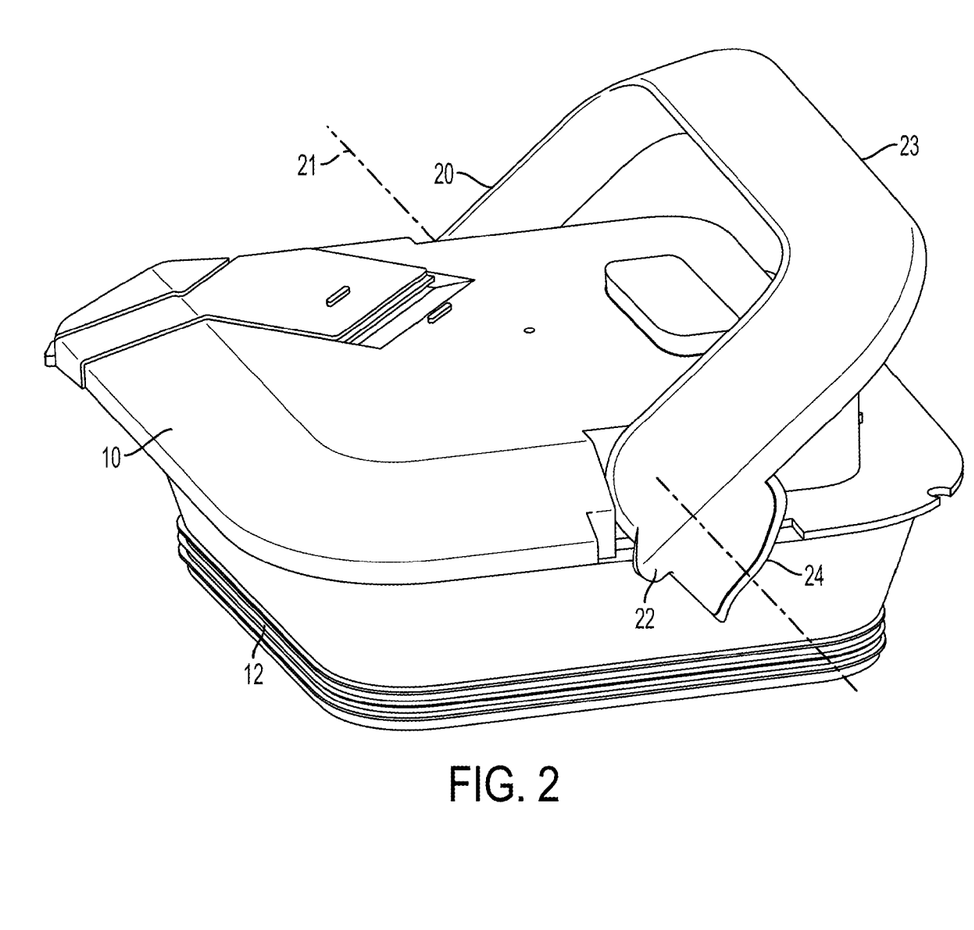
FIG. 2 is a perspective view that depicts the lid depicted in FIG. 1.

Arm 20 may be rotated relative to the lid 10 about a pivot axis 21. In some embodiments, as shown in FIGS. 1 and 2, the lid 10 includes a gasket 12 that is attached to or otherwise fixed to the lid 10. The gasket 12 may be permanently or removably attached to the lid 10. As shown in FIG. 1, when the lid 10 is engaged with the container 30, the gasket 12 forms a sealing engagement between the lid 10 and the inside surface of the container 30. In some cases, the sealing engagement formed by the gasket 12 between the lid 10 and the container 30 provides a fluid-tight seal such that fluids cannot flow between the lid 10 and the container 30. The container 30 is shown in transparent in FIG. 1 to reveal the gasket 12 and a lower portion of the lid 10 that is positioned inside the container 30. However, it should be appreciated that container 30 can be transparent, opaque, translucent, or any other suitable degree of transparency or opaqueness.

It should be appreciated that, in some embodiments, the arm is moveable relative to the lid without being rotatable relative to the lid. The arm may be slidable, pushable, and/or pullable relative to the lid, or the arm may be moved in any suitable manner relative to the lid.

In some embodiments, the gasket is permanently or removably attached to the container rather than the lid. In some embodiments, a gasket may be integrally formed with the lid or the container. In other embodiments, no gasket or seal may be included, and in some cases, engagement between the lid and the container may still provide a seal even without a gasket or gasket type component. The lid may engage with the container via an interference fit, a sliding fit, or any other suitable fit, as this aspect is not so limited.

Figure 3:
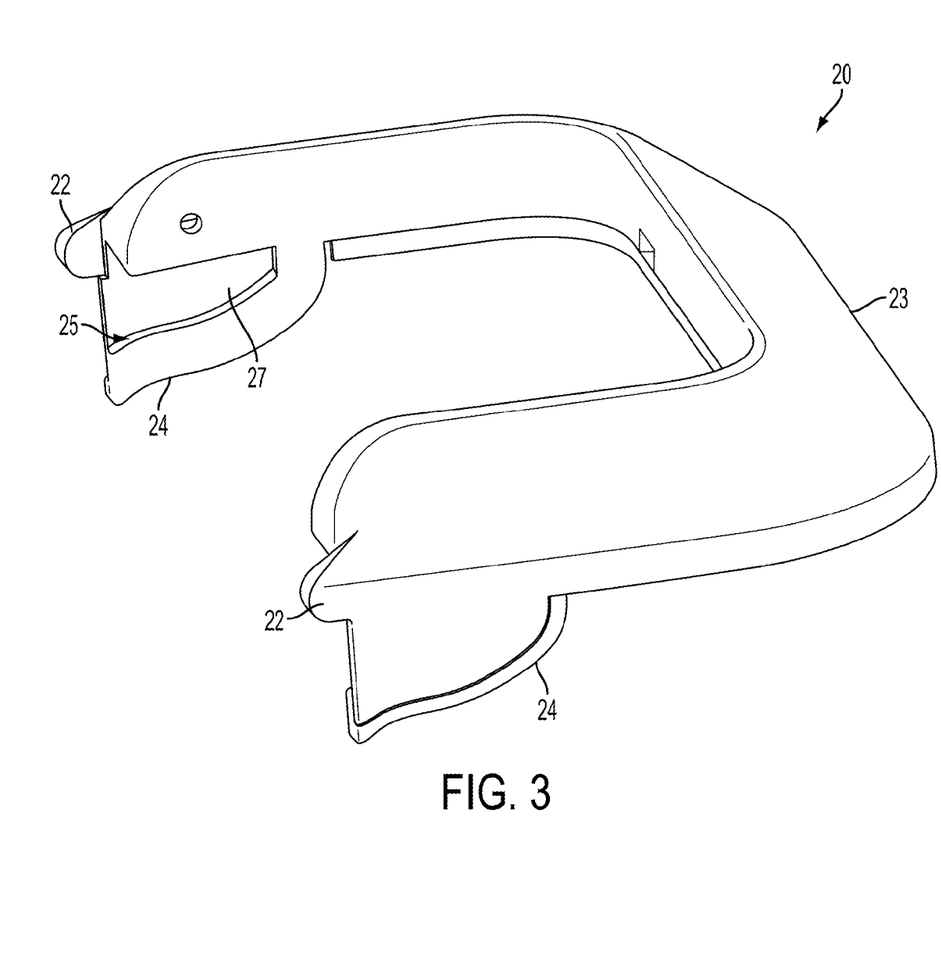
FIG. 3 is a perspective view that depicts an arm depicted in FIG. 2.

As shown in FIGS. 2-3, in some embodiments, the arm 20 may include a user-engaging portion 23 that is grasped by the user. In some cases, the user engaging portion 23 may be the portion of the arm that is furthest away from the pivot axis 21 to give the user more leverage. The user-engaging portion may be a region of the arm that is further from the arm pivot axis than all other regions of the arm. The arm 20 also may include a camming surface 22 that interacts with an engagement member on the container, as will be explained in detail. The camming surface 22 may protrude from the arm 20 and may have a rounded shape. The camming surface 22 may be integrally formed with the arm 20, or the camming surface 22 may be a separate component that is attached to the arm 20 via an adhesive, by welding, or by any other suitable attachment arrangement.

As shown in FIG. 3, in some embodiments, the arm 20 may include a locking member 24 that interacts with an engagement member on the container, as will be explained in detail. The locking member 24 may include a groove or recess 27 that is configured to receive the engagement member on the container. The locking member 24 also may include a protruding ridge 25. The locking member 24 may be integrally formed with the arm 20, etched or otherwise formed into arm 20, or the locking member 24 may be a separate component that is attached to the arm 20 via an adhesive, by welding, or by any other suitable attachment arrangement.

Figure 4:
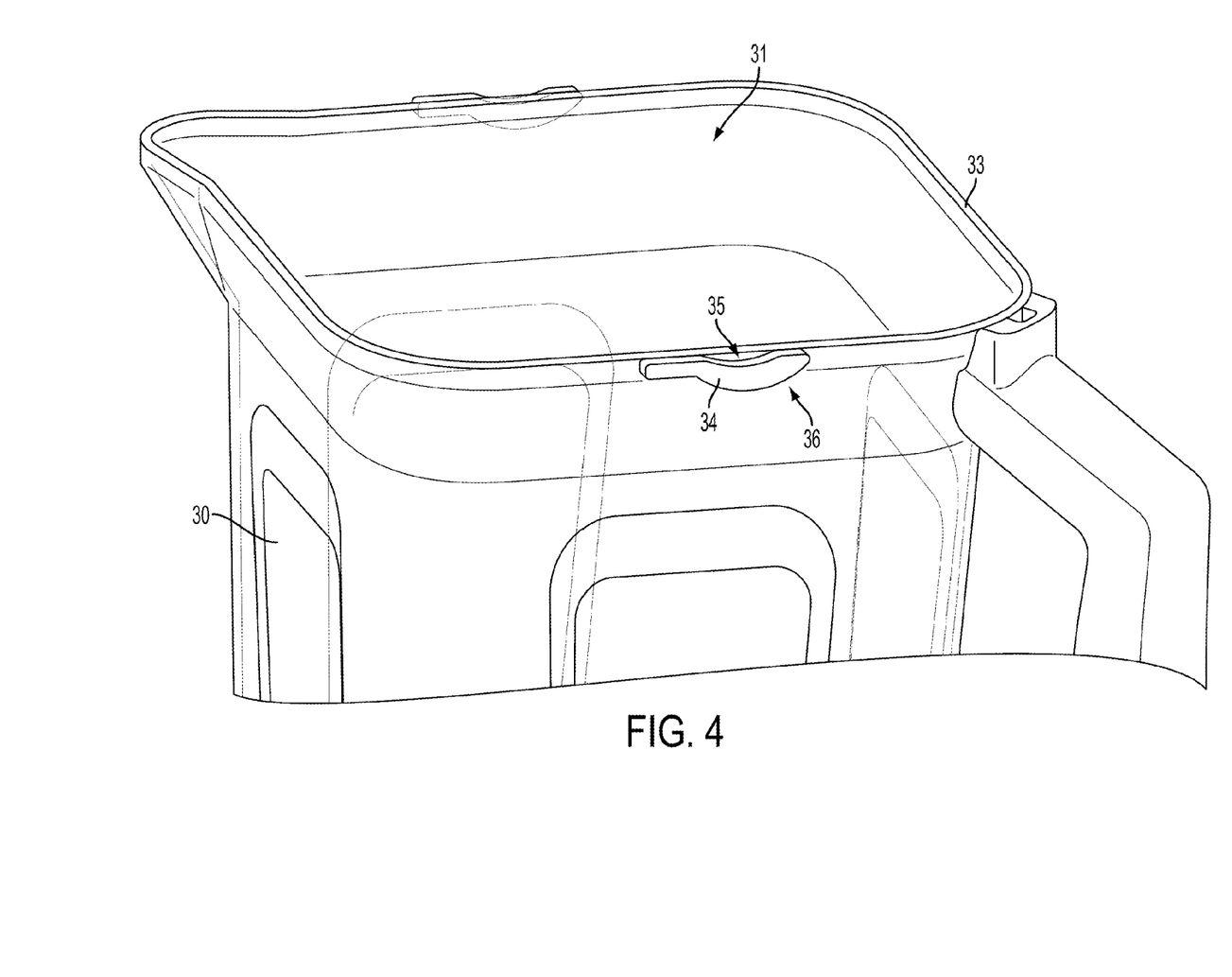
FIG. 4 is a perspective view that depicts a container with an engagement member.
Figure 10:
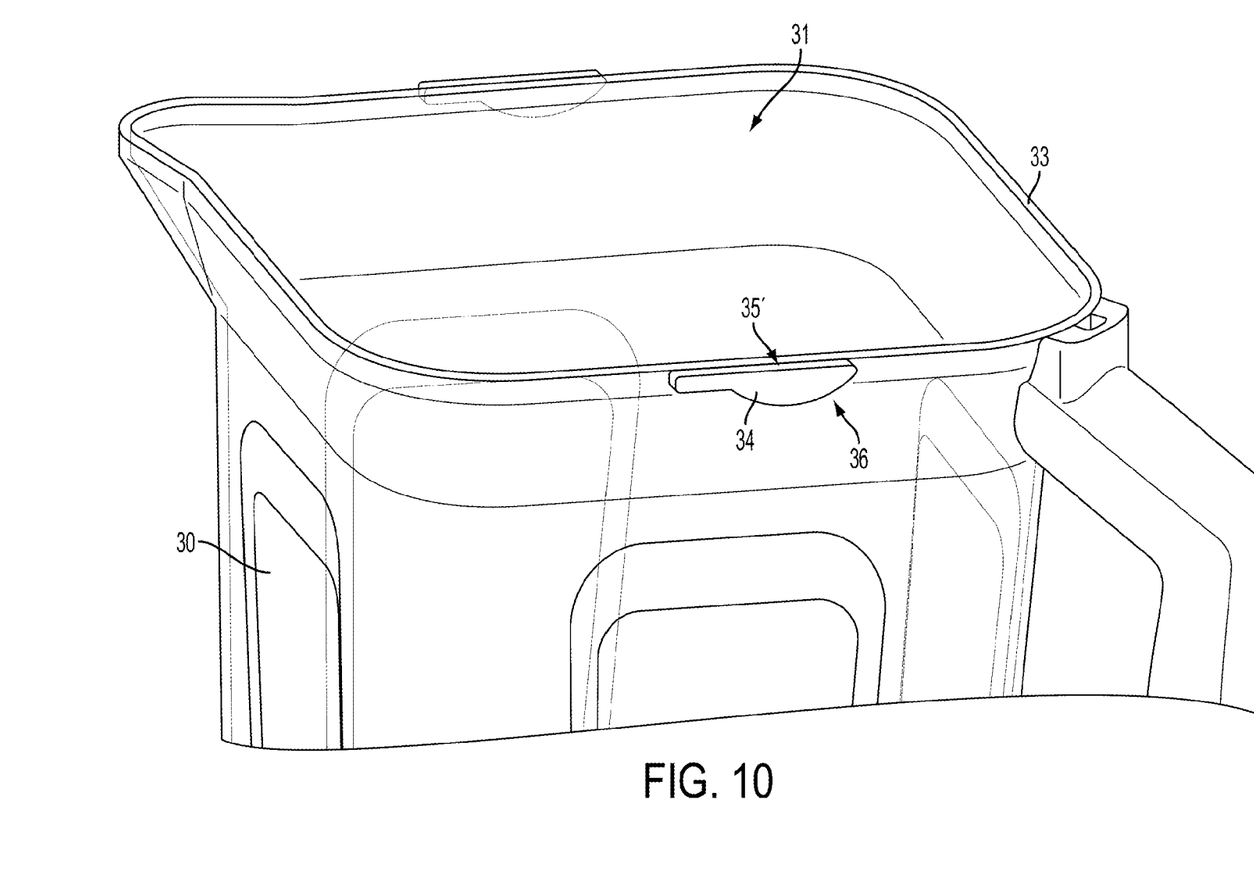
FIG. 10 is a perspective view of another embodiment that depicts a container with an engagement member.

As shown in FIG. 4, the container includes a top opening 31 with a rim 33 surrounding the opening 31. The container 30 includes a contact surface 35 that interacts with the camming surface 22 of the arm 20. As shown in FIG. 4, the contact surface 35 may be attached to an outside of the rim 33. The contact surface 35 may be a curved surface with an upwardly-facing concave. In some embodiments, the contact surface 35 may be integrally formed with the container 30, etched, or otherwise formed into the container 30. In other embodiments, the contact surface 35 may be a separate component that is attached to the container 30 via an adhesive, by welding, or by any other suitable attachment arrangement. It should be appreciated that the contact surface may be curved, flat or any suitable shape. In one embodiment, as shown in FIG. 10, the contact surface 35' is flat.

In some embodiments, the container 30 may include an engagement member 34. The engagement member 34 may include a locking surface 36. In some embodiments, the locking surface 36 of the engagement member 34 may interact with a locking member 24 on the arm 20. The locking surface 36 may have a curved surface with a downwardly-facing convex. The engagement member 34 may be integrally formed with the container 30, etched or otherwise formed into the container 30, or the engagement member 34 may be a separate component that is attached to the container 30 via an adhesive, by welding, or by any other suitable attachment arrangement.

In some embodiments, the contact surface 35 is a surface of the engagement member 34. For example, as shown in FIG. 4, contact surface 35 serves as an upper surface of engagement member 34. In other embodiments, however, contact surface 35 and engagement member 34 may be separate components. In some embodiments, a contact surface is included, while an engagement member is not included.

Figure 5:
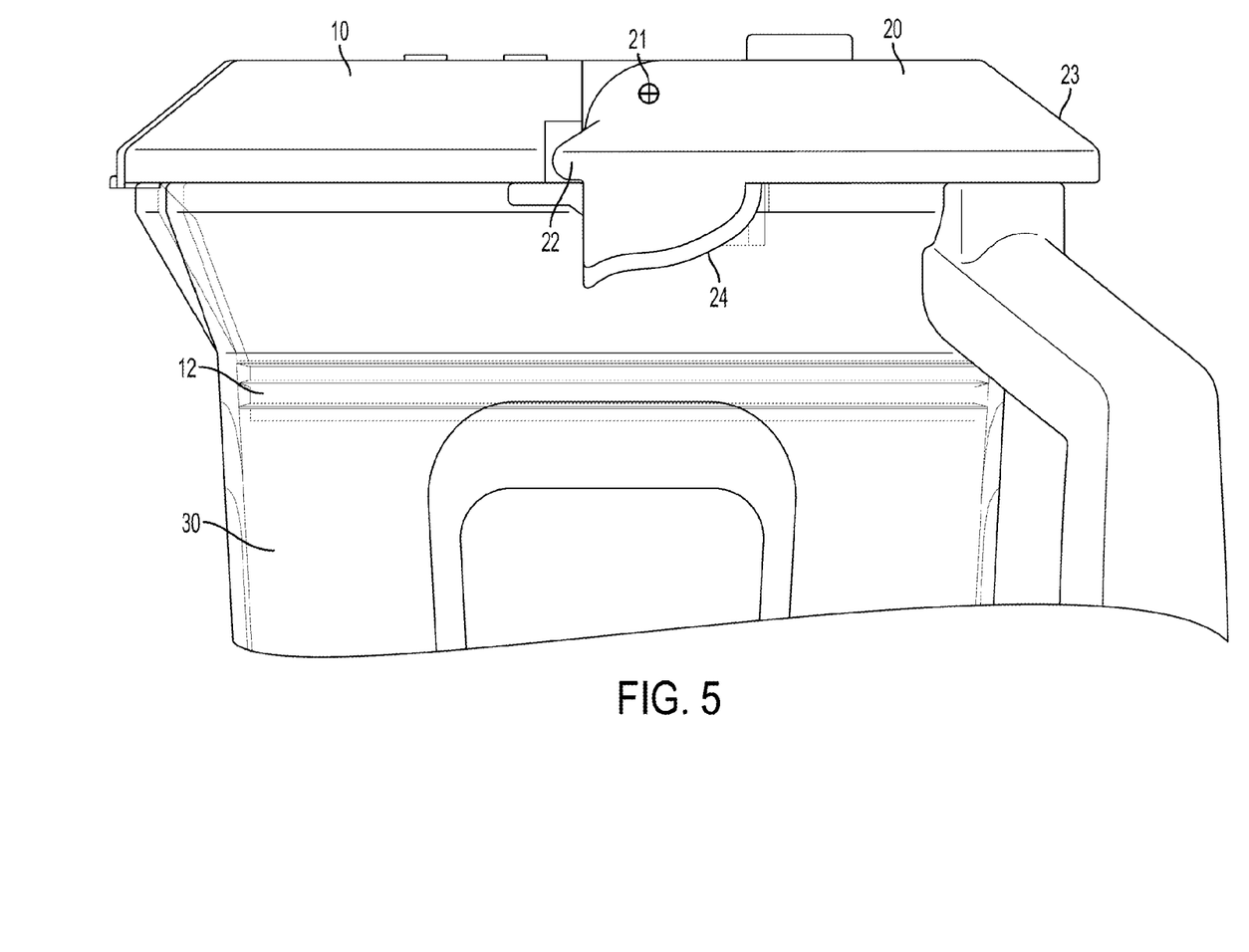
FIG. 5 is a side view that depicts a lid that is engaged with a container.

As shown in FIGS. 4-5, the top opening 31 of the container 30 may receive a portion of the lid 10 such that a portion of the lid 10 partially extends into the container 30. In this manner, the gasket 12 that is attached to lid 10 may seal against an inside surface of the container 30 when the lid 10 is engaged with the container 30, as seen in FIG. 5.

Figure 6:
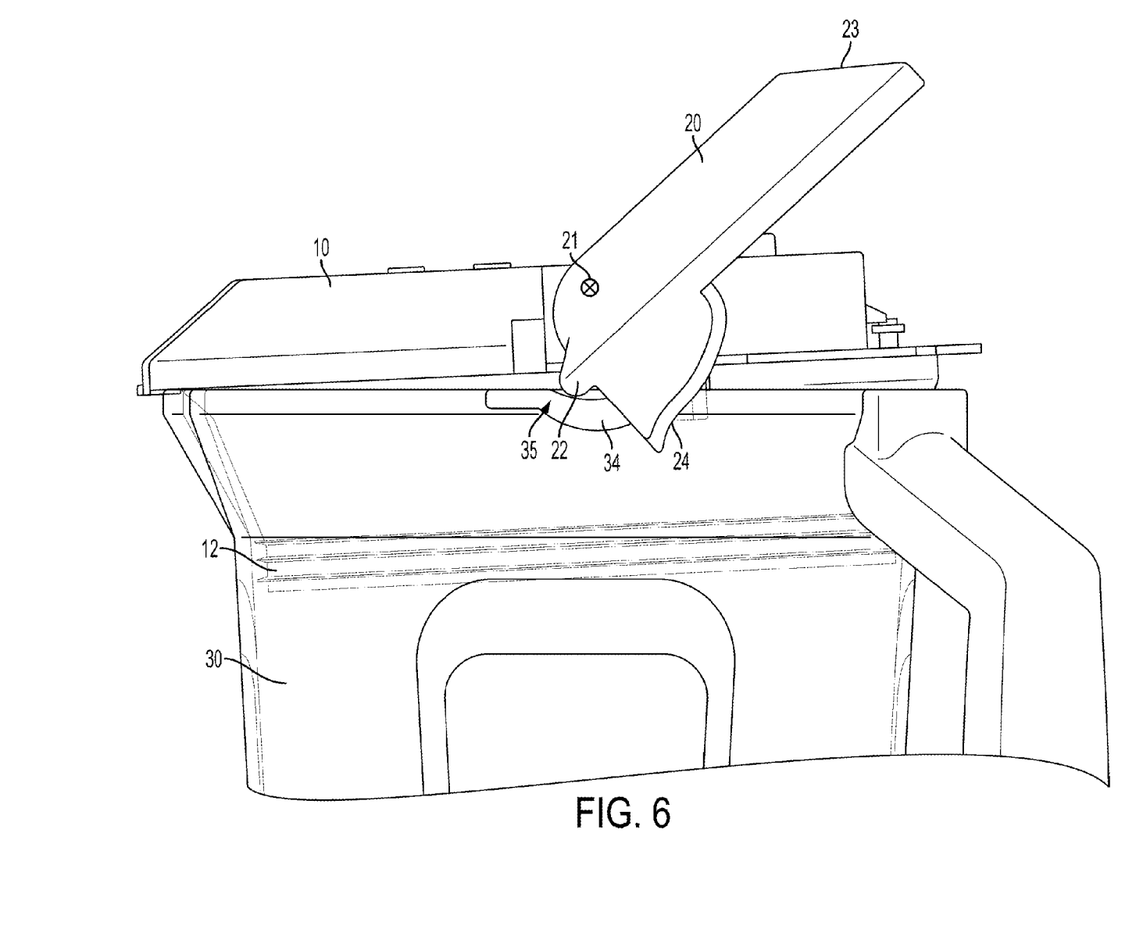
FIG. 6 is a side view that depicts a lid that is slightly separated from a container.

The operation of the lid release mechanism will now be described. In FIG. 5, the lid 10 is engaged with the container 30 such that the gasket 12 forms a sealing engagement between the container 30 and the lid 10. The container 30 may be placed on a countertop or other surface. As shown in FIG. 6, when the arm 20 is rotated counterclockwise relative to the lid 10 about the pivot axis 21, the camming surface 22 on the arm contacts and slides against the contact surface 35. As the camming surface 22 rotates and slides along the contact surface 35, the camming surface 22 exerts a downward force upon the contact surface 35. The exertion of force upon the contact surface 35 causes the contact surface 35 to exert an equal and opposite upward reaction force on the camming surface 22. Because the camming surface 22 is fixed to the arm 20 and the arm 20 is attached to the lid 10, the upward reaction force upon the camming surface 22 pushes the arm 20 upward, which causes a portion of the lid 10 to move upwards as well. As shown in FIG. 6, the right-hand side of the lid 10 tilts upwards as the camming surface 22 pushes against the contact surface 35. As a result, the gasket 12 on the lid 10 tilts upward at an angle as well. This upward tilting of the gasket 12 causes a slight separation between a portion of the gasket 12 and a portion of the inside surface of the container 30. This slight separation breaks a portion of the sealing engagement between the container 30 and the lid 10, and may significantly weaken the force of the sealing interaction between the gasket 12 and the container 30, thereby allowing the user to easily remove the lid 10 by pulling the lid up off the container 30.

In some embodiments, the lid release apparatus is arranged such that the lid does not tilt during initial removal, but instead moves substantially longitudinally away from the container.

Figure 7:
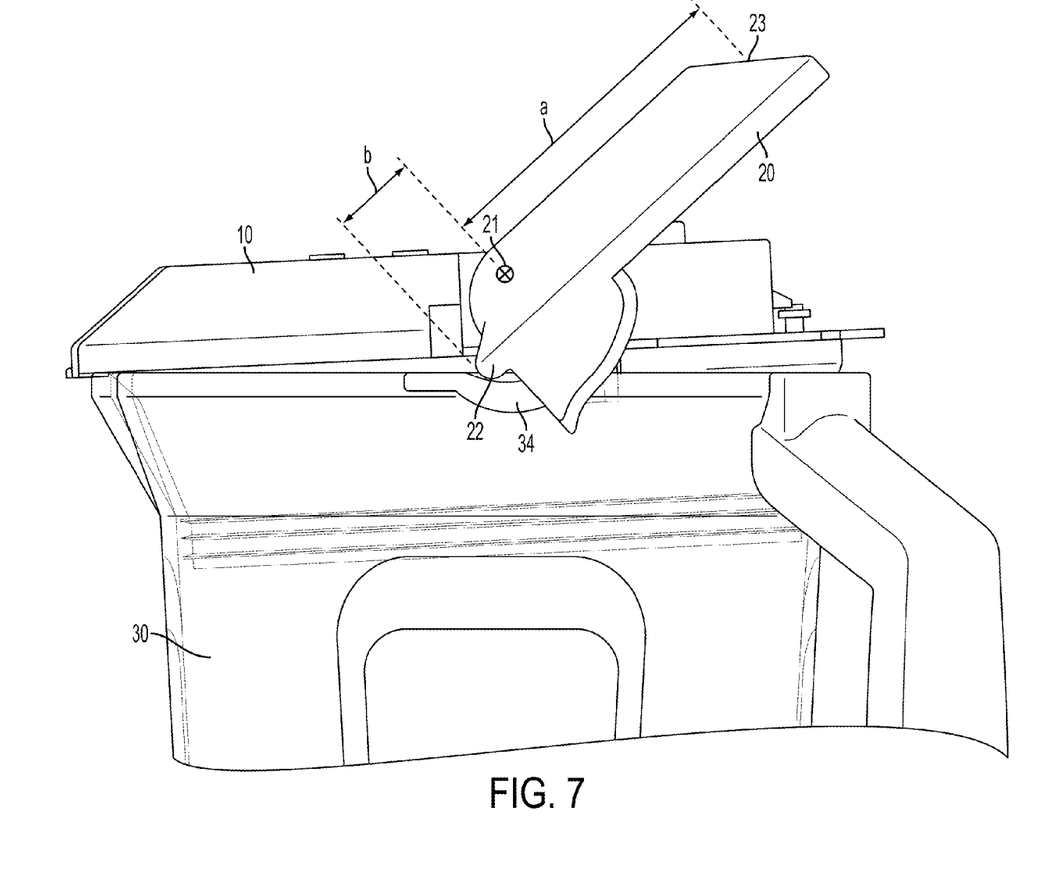
FIG. 7 is a schematic side view that depicts an arm as a lever system.

The arm 20 may act as an arm system, with pivot axis 21 as the fulcrum, the user-engaging portion 23 of the arm as the effort application point, and the camming surface 22 as the load application point. In some embodiments, the pivot axis 21, user-engaging portion 23 and camming surface 22 may be positioned to create a mechanical advantage, where mechanical advantage is defined as the ratio of output force to input force. Mechanical advantage is equal to the ratio of the distance between the fulcrum and the effort application point to the distance between the fulcrum and the load application point. As shown schematically in FIG. 7, the distance "a" between the pivot axis 21 and the user-engaging portion 23 is greater than the distance "b" between the pivot axis 21 and the camming surface 22. In such an embodiment, the arm 20 provides a mechanical advantage that helps to facilitate removal of the lid 10 from the container 30.

Figure 8A:
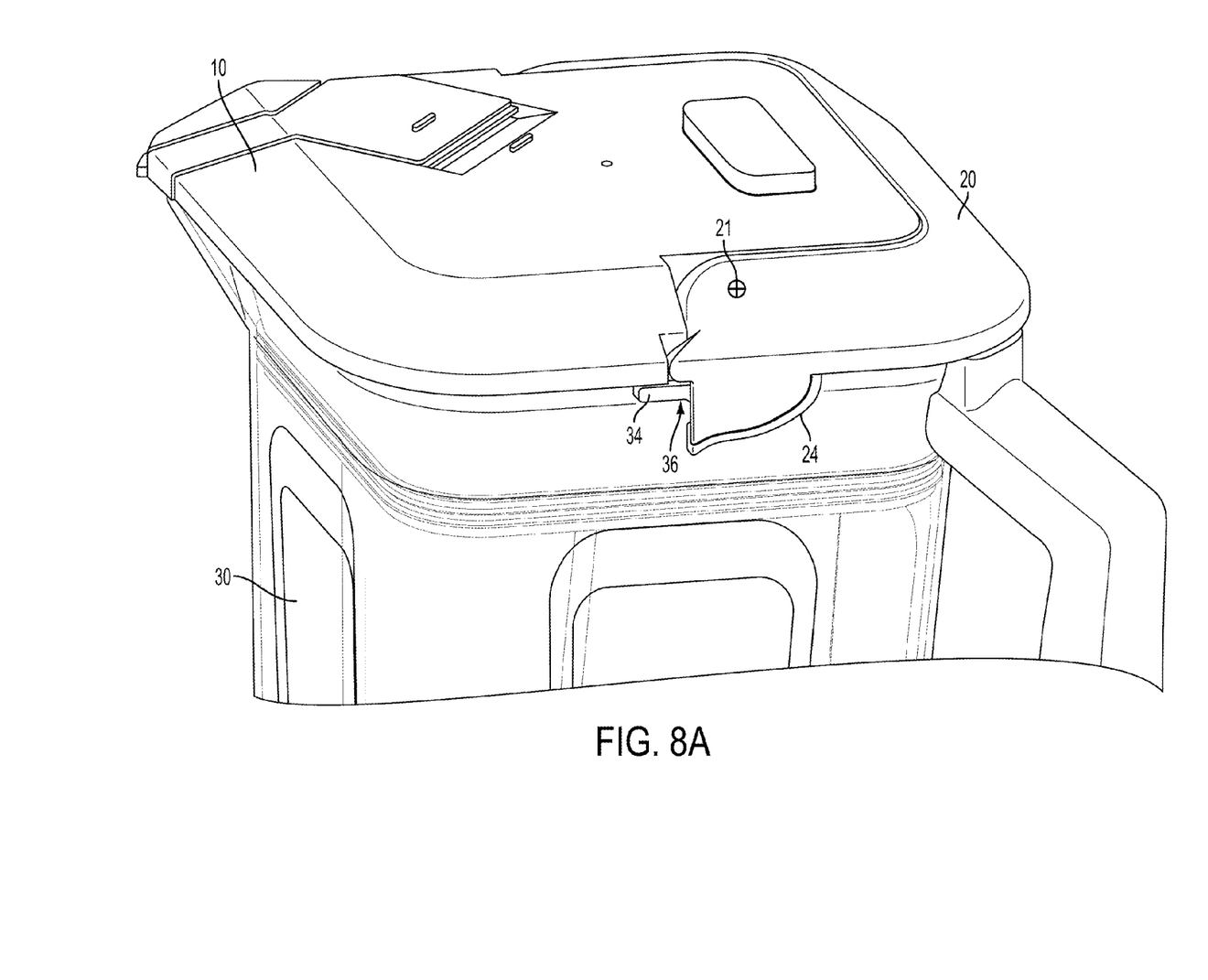
FIG. 8A is a perspective view that depicts a lid that is engaged with a container, where the arm is in a locked configuration.
Figure 8B:
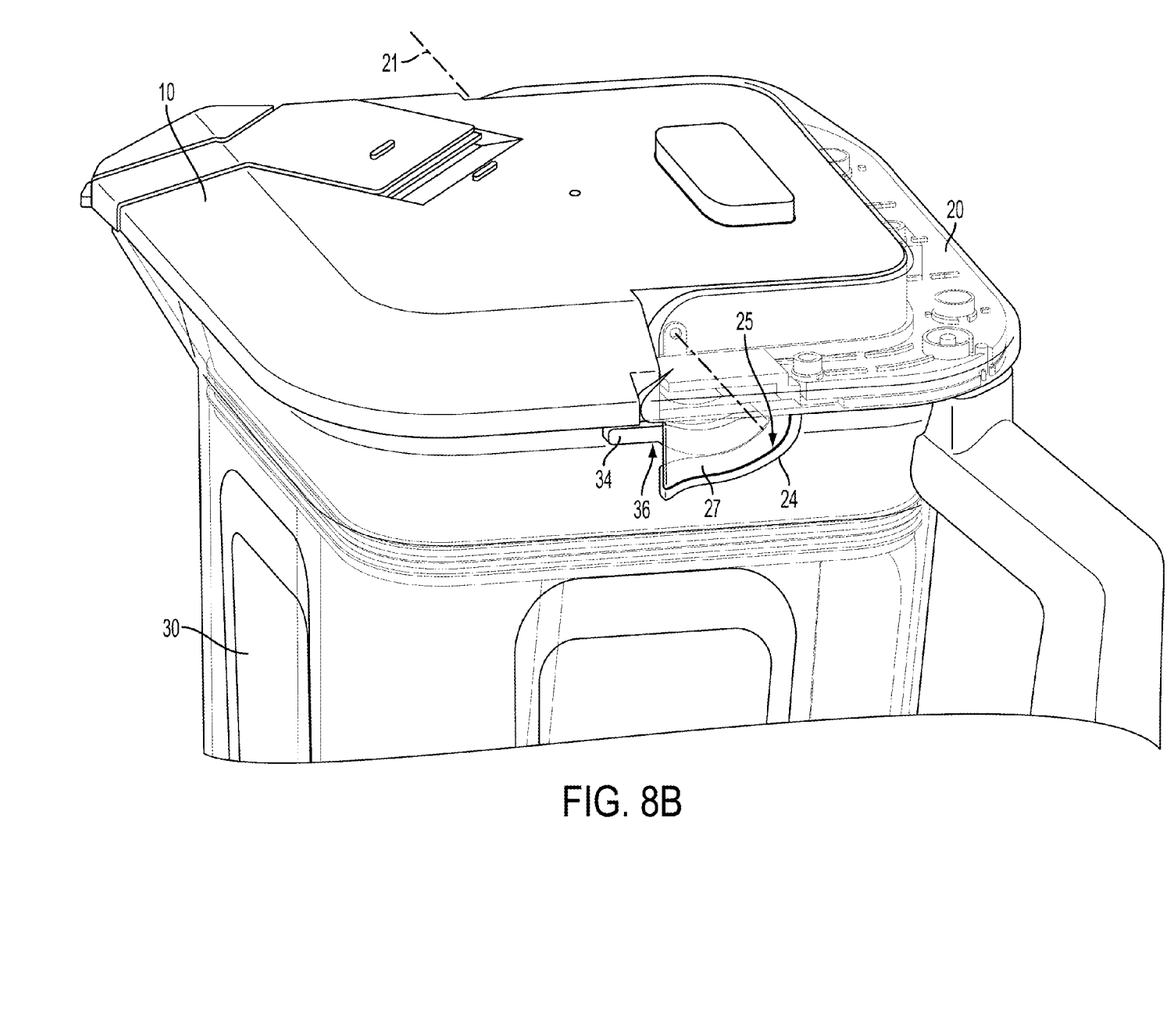
FIG. 8B is a perspective view that depicts the arrangement depicted in FIG. 8A, where the arm is shown in phantom.

The operation of the lid locking mechanism will be now described. According to one embodiment, as shown in FIG. 8A, the lid 10 is engaged with a container 30 and the arm 20 is in a locked configuration such that removal of the lid 10 from the container 30 is prohibited. As shown in FIG. 8B, where the arm 20 is shown in phantom, when the arm 20 is in a locked configuration, the engagement member 34 of the container 30 is received within the groove or recess 27 of the locking member 24 on the arm 20. Removal of the lid 10 from container 30 is prohibited due to interaction of the locking member 24 with the engagement member 34. In some embodiments, if locking member 24 were moved vertically upwards, the protruding ridge 25 of the locking member 24 (see FIG. 3) may abut the locking surface 36 of the engagement member 34, thereby preventing removal of the lid 10 from the container 30.

Figure 9:
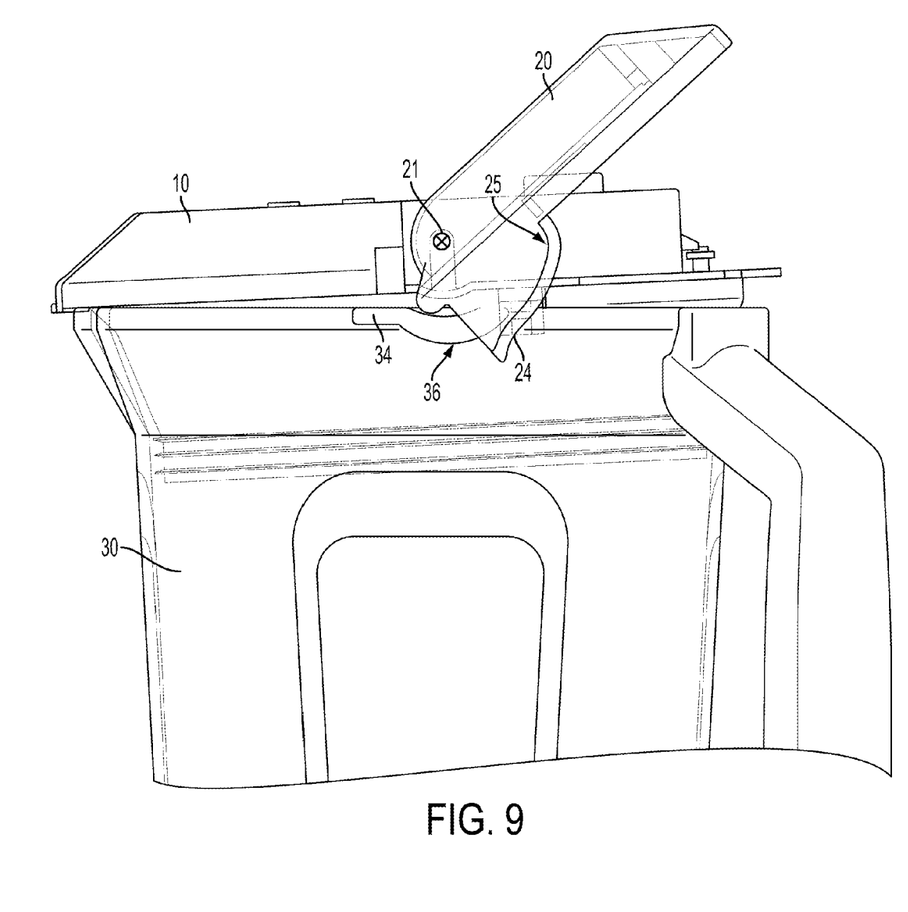
FIG. 9 is a side view that depicts a lid and a container, where the arm is in an unlocked configuration, and the arm is shown in phantom.

FIG. 9 depicts the arm 20 in an unlocked configuration. As shown in FIG. 9, once the arm 20 is rotated counterclockwise relative to the lid 10, the locking member 24 is spaced away from the engagement member 34 such that the engagement member 34 no longer obstructs the protruding ridge 25 of the locking member 24. As such, when the arm 20 is in the unlocked configuration, upward vertical movement of the locking member 24 is permitted, and thus the lid 10 can be removed from the container 30.

In some embodiments, the same engagement member can be used in both the lid release mechanism and the lid locking mechanism. In one embodiment, as shown in FIG. 4, the contact surface 35 is a surface of the engagement member 34, and the contact surface 35 interacts with the camming surface 22 of the arm 20 for the lid release mechanism. In addition, the locking surface 36 of the engagement member 34 interacts with the locking member 24 of the arm for the lid locking mechanism. However, in other embodiments, the contact surface for the lid release mechanism may be separate from the engagement member for the lid locking mechanism.

It should be appreciated that, if components 22 and 35 in the figures were reversed such that component 22 is attached to the container and component 35 is attached to the arm, the component attached to the arm would be considered a camming surface and the component on the container would be considered a contact surface.

In addition, in one embodiment, the arm 20 may be pivotally attached to the container rather than to the lid. Rotation of the arm may cause a portion of the arm to contact and slide against a portion of the lid, which may then cause a portion of the lid to be pushed up away from the container. The portion of the arm that contacts the lid would be considered a camming surface and the portion of the lid that is contacted by the arm would be considered a contact surface.

In some embodiments, the container discussed above and shown in the figures may be used in a food processing apparatus. In some cases, the container may engage with a base (not shown) that includes a motor. The motor may power a food processing assembly that processes food within the container. For example, the food processing assembly may include blades, dough hooks, whisks, stirrers, or other type of processing tools. In other embodiments, however, the container may be used for other purposes other than with a food processing apparatus. For example, the container may be a storage container for liquids and/or solids.

The above described components may be made with various materials, as the invention is not necessarily so limited.

The above aspects may be employed in any suitable combination, as the present invention is not limited in this respect. Additionally, any or all of the above aspects may be employed in a food processing apparatus; however, the present invention is not limited in this respect, as the above aspects may be employed in any container that engages with a lid.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus comprising:
   a container including an engagement member protruding outwardly from a surface of the container, a curved contact surface being disposed at an upper surface of the engagement member and a locking surface being disposed at a lower surface of the engagement member;
   a lid configured to engage with the container;
   an arm that is moveable relative to the lid, the arm having a locking member including a recess formed in a sidewall of the arm and defining a protruding ridge, the locking member being configured to receive the engagement member; and
   a camming surface;
   wherein:
   when the lid is engaged with the container, movement of the arm relative to the lid causes the camming surface to make physical contact with the curved contact surface of the engagement member;
   the physical contact between the camming surface and the curved contact surface exerts an upward force on the arm causing at least a portion of the lid to move in a direction away from the container;

wherein in a locked configuration, the engagement member is received within the recess of the locking member and contact between the locking surface of the engagement member and the protruding ridge of the locking member restricts movement of the lid in a direction away from the container.

2. The apparatus of claim 1, wherein:
when the lid is engaged with the container, the arm has a locked configuration where the lid is prevented from being removed from the container, and the arm has an unlocked configuration where the lid is removable from the container.

3. The apparatus of claim 2, wherein:
in the locked configuration, the engagement member prevents the locking member from moving in a direction away from the container; and
in the unlocked configuration, the locking member is spaced at a distance from the engagement member.

4. The apparatus of claim 1, further comprising:
a seal that provides a sealing engagement between the container and the lid when the lid is engaged with the container.

5. The apparatus of claim 1, wherein:
the arm rotates relative to the lid about a pivot axis;
the arm includes a user-engaging portion, and
a distance from the user-engaging portion to the pivot point is greater than a distance from the pivot axis to the camming surface.

6. The apparatus of claim 5, wherein the user-engaging portion comprises a region of the arm that is further from the pivot axis than all other regions of the arm.

7. The apparatus of claim 3, wherein the camming surface is a surface on the engagement member.

8. The apparatus of claim 1, wherein when the lid is engaged with the container, movement of the arm relative to the lid causes the camming surface to rotate relative to the curved contact surface.

9. The apparatus of claim 1, wherein the arm is rotatable relative to the lid and rotation of the arm relative to the lid causes the camming surface to move relative to the curved contact surface.

10. The apparatus of claim 1, wherein the arm is pivotally mounted to the lid.

11. The apparatus of claim 1, wherein the movement of the camming surface relative to the curved contact surface causes the at least a portion of the lid to tilt relative to the container.

12. An apparatus comprising:
a food processor container including an engagement member protruding outwardly from a surface of the container, a curved contact surface being disposed at an upper surface of the engagement member and a locking surface being disposed at a lower surface of the engagement member;
a lid configured to engage with the container;
an arm attached to the lid, the arm being rotatable relative to the lid, the arm having a locking member including a recess formed in a sidewall of the arm and defining a protruding ridge, the locking member being configured to receive the engagement member; and
a protrusion extending from the arm, the protrusion having a rounded surface arranged to make physical contact with and move relative to the curved contact surface when the lid is engaged with the container and the arm is rotated relative to the lid such that the engagement member is received within and hidden from view by the locking member, wherein the physical contact between the protrusion and the contact surface exerts an upward force on the arm;
wherein in a locked configuration, the engagement member is received within the recess of the locking member and contact between the locking surface of the engagement member and the protruding ridge of the locking member restricts movement of the lid in a direction away from the container.

13. The apparatus of claim 12, wherein the protrusion extends from an end of the arm.

14. The apparatus of claim 13, wherein:
the arm comprises a handle with a user-engaging portion and the handle is pivotally connected to the lid at a pivot axis; and
the user-engaging portion of the handle is on a first side of the handle relative to the pivot axis, and the protrusion is on a second side of the handle, opposite to the first side, relative to the pivot axis.

15. An apparatus comprising:
a food processor container having a top opening and a rim surrounding the opening, the container including an engagement member protruding outwardly from a surface of the container, the engagement member having an curved contact surface disposed at an upper surface of the engagement member and a locking surface disposed at a lower surface of the engagement member;
a lid configured to engage with the container;
an arm attached to the lid, the arm being rotatable relative to the lid, the arm having a locking member including a recess formed in a sidewall of the arm and defining a, the locking member being configured to receive the engagement member; and
a protrusion extending from the arm, the protrusion having a rounded surface arranged to make physical contact with and move relative to the first curved contact surface when the lid is engaged with the container and the arm is rotated relative to the lid such that the first curved engagement member is received within and hidden from view by the locking member, wherein the physical contact between the first protrusion and the contact surface exerts an upward force on the arm;
wherein in a locked configuration, the engagement member is received within the groove of the locking member and contact between the locking surface of the engagement member and the protruding ridge of the locking member restricts movement of the lid in a direction away from the container.

16. The apparatus of claim 15, further comprising:
a second curved contact surface with an upwardly facing concave, the second contact surface being attached to an outside of the rim on an opposite side of the container opening relative to the first curved contact surface.

17. The apparatus of claim 15, wherein the first curved contact surface is positioned on a lock engagement member, the lock engagement member being configured to engage with a locking mechanism on the lid.

18. The apparatus of claim 17, wherein the lock engagement member has a curved surface with a downwardly-facing convex surface.

* * * * *